United States Patent
Furrer et al.

[11] 3,872,109
[45] Mar. 18, 1975

[54] SUBSTITUTED 2-PYRONES

[75] Inventors: Harald Furrer, Frankfurt am Main; Gerhard Lohaus, Kelkheim/Taunus, both of Germany

[73] Assignee: Farbwerke Hoechst Aktiengesellschaft vormals Meister Lucius & Bruning, Frankfurt am Main, Germany

[22] Filed: Feb. 27, 1974

[21] Appl. No.: 446,289

[30] Foreign Application Priority Data
Mar. 1, 1973  Germany............................ 2310306

[52] U.S. Cl...... 260/343.5, 260/86.1 R, 260/88.3 A
[51] Int. Cl................................................ C07d 7/16
[58] Field of Search.................................. 260/343.5

[56] References Cited
OTHER PUBLICATIONS
Vashakidze et al., Zh. Org. Khim. 1970, 6(9), pp. 1918–1922.

Primary Examiner—Lorraine A. Weinberger
Assistant Examiner—E. Jane Skelly
Attorney, Agent, or Firm—Curtis, Morris & Safford

[57] ABSTRACT

Novel substituted 2-pyrones

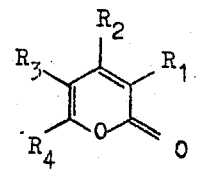

in which one of the radicals $R_1$ to $R_4$ is substituted by an acryloyl or methacryloyl group are obtained from the corresponding 2-pyrone derivatives and acrylic or methacrylic acid or a derivative thereof. The compounds can be polymerized forming light-sensitive polymers which are cross-linked by the action of light and may be used in light-sensitive copying layers.

8 Claims, No Drawings

SUBSTITUTED 2-PYRONES

The present invention relates to substituted 2-pyrones and process for their preparation.

Numerous substituted 2-pyrones have been described so far; known 2-pyrones are e.g. those with alkyl, cycloalkyl, aryl, aralkyl and heterocyclic lateral groups. Processes for the preparation of 2-pyrones with alkyl, cycloalkyl, aryl, aralkyl or heterocyclic radicals which are substituted by halogen, nitro, alkoxy, acyloxy, cyano, carbalkoxy or carbonyl groups (cf. Elderfield, "Heterocyclic Compounds", 2nd edition, vol. 1 page 354 et seq.) have also been described.

Subject of the present invention are substituted 2-pyrones having the formula

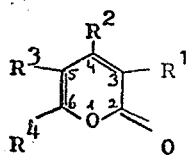   I wherein
$R_1$ is hydrogen, alkyl having from 1 to 4 carbon atoms or halogen;
$R_2$ is alkyl having from 1 to 4 carbon atoms;
$R_3$ is hydrogen, alkyl having from 1 to 4 carbon atoms or halogen;
$R_4$ is alkyl having from 1 to 6 carbon atoms, cycloalkyl having from 5 to 8 carbon atoms or phenyl optionally substituted by chlorine atoms or methyl groups; and one single radical among $R_1$, $R_3$ and $R_4$ represents the group

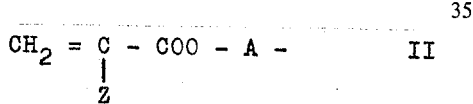   II wherein
Z stands for hydrogen or methyl and A for straight-chain or branched alkylene having from 1 to 6 carbon atoms.

These compounds are methacrylic acid esters or acrylic acid esters of 2-pyrone-alcohols. Preferred compounds are those where A of their formula I stands for methylene radical or ethylene radical being substituted by one or several methyl groups, but especially for —$CH_2$—.

Further preference is given to esters carrying the radical

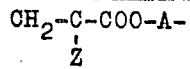

in 6-position on the pyrone-ring and a methyl group in 4-position.

The present invention also provides a process for the preparation of compounds having formula I, which process comprises reacting in known manner 2-pyrone-derivatives of formula

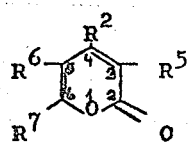   II wherein
$R_5$ and $R_6$ are hydrogen, alkyl having from 1 to 4 carbon atoms or halogen;
$R_7$ is alkyl having from 1 to 6 carbon atoms, cycloalkyl having from 5 to 8 carbon atoms, preferably cyclohexyl, or phenyl optionally being substituted by chlorine atoms or methyl groups, and one single among the radicals $R_5$, $R_6$ and $R_7$ represents the group —A—X, with compounds having the formula

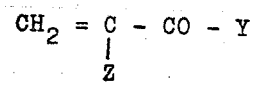

whereas either
a. X represents hydroxyl and Y represents hydroxyl, halogen or alkoxy having from 1 to 4 carbon atoms, or
b. X represents the radical -OB, wherein B stands for the cation of an inorganic or organic base and Y represents halogen; or
c. X represents halogen or an alkyl or arylsulfonyl radical and Y represents the radical OB.

It is therefore possible to vary the preparation of the acrylic acid esters and methacrylic acid esters of 2-pyrone-alcohols in the following manner:

1. Hydroxy-alkyl-2-pyrones accordingly substituted are reacted with an acrylic acid halide or a methacrylic acid halide in a suitable solvent such as benzene, methylene chloride, acetone, generally at temperatures from 0° to 80°C or at the boiling temperature of the solvent used, in the presence of an acid binding agent, for example a tertiary amine, and of a polymerization inhibitor. Suitable tertiary amines are, inter alia, triethylamine, tributylamine, pyridine, endodimethylene-piperazine, the picolines and quinoline.

2. Hydroxyalkyl-2-pyrones are esterified by either heating them to reflux temperature in a suitable solvent such as benzene, toluene or 1,2-dichloroethane together with acrylic acid or methacrylic acid in the presence of an esterification catalyst, for example p-toluene-sulfonic acid, and of a polymerization inhibitor and separating the water formed during the reaction in a water trap, or operating in the presence of a condensing agent such as carbodiimides, thionyl chloride, acetyl chloride, chloroformic acid esters or N-N'-carbonyldiimidazole.

3. Lower acrylic acid esters or methacrylic acid esters, for example ethylacrylate or methylmethacrylate, are transesterified with the corresponding hydroxyalkyl-2-pyrone-alcohols in the presence of catalysts, e.g. sulfuric acid, p-toluene-sulfonic acid, aluminum triisopropylate, or titanium tetraisopropylate.

4. Nucleophile exchange is brought about by reacting halogenoalkylated 2-pyrones or the sulfonic acid esters of hydroxyalkyl-2-pyrones with an acrylic acid salt or methacrylic acid salt (for example ammonium salt, sodium salt, pyridinium salt or triethylammonium salt) or, vice versa, the potassium salt or sodium salt of a hydroxy-alkylpyrone is reacted with an acrylic acid halide or a methacrylic acid halide in the presence of a polymerization inhibitor in a suitable solvent, for example methylene chloride, chloroform, benzene, toluene, acetonitrile, methanol, ethanol, acetone or dimethyl formamide at temperatures from 0° to 110°C or preferably the boiling temperature of the respective solvent or in the melt, preferably at temperatures from 80° to 150°C. To reduce the reaction period, the acrylic acid salts and methacrylic acid salts are preferably used in excess quantities.

This latter method enables generally to obtain the corresponding 2-pyrone-acrylates and methacrylates with good to excellent yield rates and is therefore preferably used.

Suitable polymerization inhibitors to be optionally used are, for example, copper-(I)-chloride, hydroquinone, hydroquinone-monomethyl-ether, phenothiazine, semicarbazide hydrochloride and acetone-semicarbazone.

The pyrone derivatives which are needed as initial products for preparing esters of the general formula I, are advantageously obtained by the action of corresponding carboxylic acid chlorides on dialkylacrylic acid esters or trialkylacrylic acid esters and subsequent ring closure (Lohaus et al. Berichte, 100, 658 (1967)). For the preparation of 6-halogenoalkyl-2-pyrones the corresponding halogeno-carboxylic acid chlorides are used. The 3- or 5-chloromethyl-2-pyrones are easily obtainable by chloromethylation of 2-pyrones which carry hydrogen atoms in 3- or 5-position. The initial products chlorinated or brominated at the nucleus in 3- and/or 5-position are formed, for example, by reaction of the corresponding 2-pyrones having hydrogen atoms in 3- or/and 5-position with chlorine (or sulfuryl-chloride) or with bromine.

The hydroxy alkyl-2-pyrones may be prepared, for example, from the corresponding halogenoalkyl-2-pyrones according to known methods. The following 2-pyrones may, for example, serve as initial products:

4,6-dimethyl-3-chloromethylpyrone-(2), 4-methyl-3-chloromethyl-6-phenylpyrone-(2), 4,6-dimethyl-3-bromomethylpyrone-(2), 4-methyl-3-iodomethyl-6-phenylpyrone-(2), 3,4-dimethyl-6-chloromethylpyrone-(2), 3,4,5-trimethyl-6-bromomethylpyrone-(2), 3-chloro-4-methyl-6-chloromethylpyrone-(2), 3-bromo-4-methyl-6-bromomethylpyrone-(2), 4-methyl-6-chloromethylpyrone-(2), 5-chloro-3,4-dimethyl-6-chloromethylpyrone-(2), 3,5-dichloro-4-methyl-6-chloromethylpyrone-(2), 4,6-dimethyl-3-hydroxymethylpyrone-(2), 3,4,6-trimethyl-5-hydroxymethylpyrone-(2), 4-methyl-6-hydroxymethylpyrone-(2), 4-methyl-6-[2'-hydroxy-2'-methyl]-propylpyrone-(2), 4-methyl-3-chloromethyl-6-p-tolylpyrone-(2), 4-methyl-3-bromomethyl-6-p-chlorophenylpyrone-(2), 4-methyl-3-hydroxymethyl-6-butylpyrone-(2), 4-methyl-3-chloromethyl-6-cyclohexylpyrone-(2), 3-chloro-4-methyl-6-hydroxymethylpyrone-(2), 3,4-dimethyl-6-hydroxymethylpyrone-(2), 4-methyl-6-chloromethyl-3-propylpyrone-(2), 5,6-dimethyl-3-chloromethyl-4-ethylpyrone-(2), 4-methyl-3-chloromethyl-5-propyl-6-p-tolylpyrone-(2), 4-methyl-6-iodomethylpyrone-(2), 4-methyl-6-(4'-hydroxybutyl)-pyrone-(2).

The 2-pyrones substituted according to the invention may be converted by free-radical-initiated polymerization (UV-light excluded, e.g. in yellow light) — while preserving the pyrone structure — either directly to linear homopolymers or, in the presence of a different reactive vinyl monomer, to linear copolymers. It is also possible, of course, to copolymerize the 2-pyrone monomer with more than one vinyl monomer, for example in order to obtain special properties such as solubility or mechanical behaviour of the polymer.

Due to the presence of 2-pyrone-radicals such polymers may be cross-linked by the action of light, and may be used in light-sensitive copying layers for the preparation of printing blocks or photoresists.

The following examples illustrate the invention:

EXAMPLE 1

3.2 g (30 mMoles) of methacrylic acid chloride are added dropwise at 25°C while stirring to 2.8 g (20 mMoles) of 4-methyl-6-hydroxymethylpyrone-(2), 3 g (30 mMoles) of triethylamine and 50 g of Cu-I-chloride in 50 ml of anhydrous benzene. After heating for 30 minutes to 80°C, the product is cooled in an ice bath, submitted to filtration and the filtrate evaporated in a rotating piston evaporator. The residue is re-crystallized from pentane.

3.4 g of 4-methyl-6-methacryloyloxymethylpyrone-(2) are obtained, melting point 44°–45°C $C_{11}H_{12}O_4$ (208.2): calc: C 63.45 %; H 5.81 %. found: C 63.3 %; H 5.7 %.

EXAMPLE 2

73 g (0.72 mole) of triethylamine are added dropwise at room temperature, while stirring to a solution of 95 g (0.6 mole) of 4-methyl-6-chloromethylpyrone-(2), 62 g (0.72 mole) of methacrylic acid and 0.2 g of acetone-semicarbazone in 600 ml of anhydrous acetone. After having heated under reflux for 8 hours (upon checking by gas chromatography it is found that at the end of this period the 4-methyl-6-chloromethylpyrone-(2) is reacted completely), the product is cooled in an ice bath to 5°C, triethylammonium chloride is suctioned off and the filtrate is reduced in a rotating piston evaporator. After re-crystallization from petroleum ether (boiling range from 60° to 80°C), 116 g of 4-methyl-6-methacryloyloxymethylpyrone-(2), melting point 43°C, are obtained.

EXAMPLE 3

20.3 g (0.1 mole) of 4-methyl-6-bromomethylpyrone-(2), 11.4 g (0.105 mole) of sodium methacrylate and 100 mg of h hydroquinone are heated for 6 hours to 155°C while stirring. Subsequently, the thick sludge is taken up by $CH_2Cl_2$, the solution is filtered and concentrated and the residue is re-crystallized from petroleum ether (boiling range from 60°–80°C).

18.7 g of 4-methyl-6-methacryloyloxymethylpyrone-(2), melting point 42°–43°C are obtained.

EXAMPLE 4

10.5 g (0.104 mole) of triethylamine are added dropwise at room temperature, while stirring to 15.9 g (0.1 mole) of 4-methyl-6-chloromethylpyrone-(2), 10.3 g (0.12 mole) of methacrylic acid and 150mg of thiodiphenylamine in 100 ml of chloroform and the mixture is heated under reflux. The reaction is interrupted after 38 hours, the reaction mixture is shaken with 200 ml of $H_2O$, dried and concentrated. The residue of 20.6 g is re-crystallized from petroleum ether (boiling range from 60°to 80°C). 18.3 g of 4-methyl-6- methacryloyloxymethylpyrone-(2), melting point 43°C, are obtained.

EXAMPLE 5

A solution of 4.4 g (0.11 mole) of NaOH in 70 ml of ethanol is added dropwise at room temperature while stirring to a solution of 15.9 g (0.1 mole) of 4-methyl-6-chloromethylpyrone-(2), 9.5 g (0.11 mole) of methacrylic acid and 100 mg of hydroquinone in 100 ml of ethanol. After 25 hours of heating to reflux temperature the product is cooled to 5°C, submitted to filtration, concentrated and the residue taken up by $CH_2Cl_2$. The solution is washed with water, dried and concentrated. 16.2 g of oily residue yield 13 g of 4-methyl-6-methacryloyloxymethylpyrone-(2), melting point from 38°–40°C, by extraction with petroleum ether (boiling range from 60°–80°C).

EXAMPLE 6

25 g (0.1 mole) of 4-methyl-6-iodomethylpyrone-(2), 11.9 g (0.11 mole) of sodium methacrylate, 1 g (0.01 mole) of methacrylic acid and 0.1 g of hydroquinone are heated under reflux in 100 ml of acetone, while stirring. After 33 hours the product is cooled in an ice bath, submitted to filtration and concentrated. Further work-up according to Example 5. 4.6 g of 4-methyl-6-methacryloyloxymethylpyrone-(2), melting point 40°–41°C, are obtained.

EXAMPLE 7

10.5 g (0.104 mole) of triethylamine are added dropwise at room temperature to 15.9 g (0.1 mole) of 4-methyl-6-chloromethylpyrone-(2), 9.3 g (0.11 mole) of methacrylic acid and 20 mg of hydroquinone in 150 ml of benzene, the limpid solution is subsequently heated under reflux. After 19 hours the product is cooled in an ice bath, the precipitated triethylammonium chloride filtered off, the benzonic solution washed with $H_2O$, dried and concentrated in a rotating piston evaporator. 19.8 g of residue with 98 % of 4-methyl-6-methacryloyloxymethylpyrone-(2) are obtained.

EXAMPLE 8

80 g (0.5 mole) of 4-methyl-6-chloromethylpyrone-(2), 44 g (0.61 mole) of acrylic acid and 0.1 g of Cu-I-chloride in 600 ml of acetone are mixed dropwise at room temperature, while stirring, with 62 g (0.61 mole) of triethylamine. After having heated the mixture under reflux for 8 hours, the product is cooled in an ice bath to 5°C, filtered off and the filtrate concentrated in a rotary piston evaporator. The residue is taken up by methylene chloride, washed twice with $H_2O$ and the dried methylene chloride phase is then concentrated. 87 g of 4-methyl-6-acryloyloxymethylpyrone-(2), melting point 44°–45°C, are obtained (double recrystallization from pentane).

$C_{10}H_{10}O_4$ (194.1): calc: C 61.85 %; H 5.19 %. found: C 61.6 %; H 5.2 %.

EXAMPLE 9

2.7 g (30 mmoles) of acrylic acid chloride are added dropwise at room temperature, while stirring, to 2.8 g (20 mmoles) of 4-methyl-6-hydroxymethylpyrone-(2), 3 g (30 mmoles) of triethylamine and 50 mg of Cu-I-chloride in 50 ml of anhydrous benzene. After a 30 minutes' heating period under reflux, the product is cooled in an ice bath, filtered off and concentrated in a rotating piston evaporator. The residue crystallized from pentane yields 3.4 g of 4-methyl-6-acryloyloxymethylpyrone-(2).

EXAMPLE 10

250 g (2.5 moles) of triethylamine are added dropwise at reflux temperature to 101 g (0.59 mole) of 3,4-dimethyl-6-chloromethylpyrone-(2), 206 g (2.4 moles) of methacrylic acid and 20 mg of Cu-I-chloride in 1 liter of acetonitrile. After heating under reflux for 4 hours the product is concentrated in a rotating piston evaporator. The residue is digested thoroughly with methylene chloride and water; the methylene chloride phase is concentrated after washing with water and drying. The residue is dissolved in boiling ether and the solution saturated with pentane. 110 g of 3,4-dimethyl-6-methacryloyloxymethyl-pyrone-(2) - melting point 90°–91°C — (recrystallization once from ether/pentane, twice from hexane) are obtained.

$C_{12}H_{14}O_4$ (222.2) : calc.: C 64.85 %; H 6.35 %. found: C 64.9 %; H 6.4 %.

EXAMPLE 11

6.1 g (60 mmoles) of triethylamine are added dropwise at boiling temperature to 9.65 g (50 mmoles) of 3-chloro-4-methyl-6-chloromethylpyrone-(2), 5.2 f (60 mmoles) of methacrylic acid and 20 mg of Cu-I-chloride in 150 ml of acetonitrile. A heating period of 8 hours under reflux is followed by cooling in an ice bath, filtration and concentration in a rotating piston evaporator. The hot residue is extracted with 1 liter of ether. The ethereal extract is washed twice with 100 ml of water and saturated with pentane.

9.5 g of 3-chloro-4-methyl-6-methacryloyloxymethylpyrone-(2) are obtained having a melting point of 118°–120°C (triple re-crystallization from ether/pentane).

$C_{11}H_{11}O_4Cl$ (242.6): calc.: C 54.47 %; H 4.59 %. found: C 54.5 %; H 4.5 %.

EXAMPLE 12

6.1 g (60 mmoles) of triethylamine are added dropwise at room temperature to 8.6 g (50 mmoles) of a mixture composed of 15 % of 4,6-dimethyl-5-chloromethylpyrone-(2) and 85 % of 4,6-dimethyl-3-chloromethyl-pyrone-(2), 5.2 g (60 mmoles) of methacrylic acid and 50 mg of acetone-semicarbazone in 50 ml of acetone. The product is heated for 9 hours to reflux temperature, concentrated, taken up in approximately 500 ml of methylene chloride, washed twice with 50 ml each of water, dried and concentrated again: 10 g of a light yellow, oily residue with 0.7 g of 4,6-dimethyl-5-methacryloyloxymethylpyrone-(2) and 3.3 g of 4,6-dimethyl-3-methacryloyloxymethylpyrone-(2) are obtained. By fractional re-crystallization from petroleum ether (boiling range from 60°–80°C) it is possible to obtain from the oily residue 4,6-dimethyl-3-methacryloyloxymethyl-pyrone-(2) in pure form. 4,6-dimethyl-5-methacryloyloxymethylpyrone-(2) is concentrating in the mother liquor. 4,6-dimethyl-3-methacryloyloxymethylpyrone-(2) has a melting point of 89°–90°C (hexane).

$C_{12}H_{14}O_4$ (222.2): calc.: C 64.85 %; H 6.35 %; O 28.80 %. found: C 64.5 %; H 6.1 %; O 28.6 %.

The mixture of the two pyrone-derivatives specified may be used directly for polymerization purposes.

EXAMPLE 13

350 mg (33 mmoles) of methacrylic acid chloride in 3 ml of anhydrous chloroform are added dropwise while stirring to 360 mg (20 mmoles) of 4-methyl-6-[2'-hydroxy-2'-methyl]-propylpyrone-(2) and 10 mg of Cu-I-chloride in 5 ml of anhydrous pyridine. After standing for 72 hours at room temperature, the product is subsequently concentrated in a rotating piston evaporator (bath temperature 35°C), taken up by 50 ml of methylene chloride, shaken once with water containing a small amount of hydrochloric acid and once with water only, dried and concentrated. The residue is submitted to preparative thin-layer chromatography (2 mm silica gel plates, eluant: benzene/acetone =4/1) for separation; 99 mg of 4-methyl-6-[2'-methacryloyloxy-2'-methyl]-propylpyrone-(2) are obtained as an oil.

$C_{14}H_{18}O_4$ (250.2): calc.: C 67.18 %; H 7.25 %. found: C 67.0 %; H 7.5 %.

EXAMPLE 14

The mixture of 1.1 g of 4-methyl-6-hydroxymethyl-pyrone-(2), 2.7 g of methacrylic acid, 0.3 g of p-toluene-sulfonic acid and 0.15 g of hydroquinone in 80 ml of benzene is heated under reflux and the water formed in the course of the reaction is separated by means of a water separator. The reaction is interrupted after 72 hours, the reaction mixture taken up by ether and the undissolved matter is filtered off. The product is washed twice with water, twice with saturated sodium bicarbonate solution, once again with water and finally concentrated after drying over $Na_2SO_4$. The re-crystallization of the residue from hexane yields 1.3 g of 4-methyl-6-methacryloyloxymethylpyrone-(2), melting point 39.5°–41.5°C.

The processes described in examples 1 to 14 are also applicable, inter alia, for the preparation of the following methacryloyl-pyrones-(2) or acryloylpyrones-(2): 4,6-dimethyl-3-methacryloyloxymethylpyrone-(2), 4-methyl-3-acryloyloxymethyl-6-phenylpyrone-(2), 4,6-dimethyl-3-acryloyloxymethylpyrone-(2), 4-methyl-3-methacryloyloxymethyl-6-phenylpyrone-(2), 3,4-dimethyl-6-methacryloyloxymethylpyrone-(2), 3,4,5-trimethyl-6-methacryloyloxymethylpyrone-(2), 3-chloro-4-methyl-6-methacryloyloxymethylpyrone-(2), 3-bromo-4-methyl-6-acryloyloxymethylpyrone-(2), 4-methyl-6-acryloyloxymethylpyrone-(2), 5-chloro-3,4-dimethyl-6-methacryloyloxymethylpyrone-(2), 3,5-dichloro-4-methyl-6-methacryloyloxymethylpyrone-(2), 3,4,6-trimethyl-5-methacryloyloxymethylpyrone-(2), 4-methyl-3-methacryloyloxymethyl-6-p-tolylpyrone-(2), 4-methyl-3-acryloyloxymethyl-6-p-chlorophenylpyrone-(2), 4-methyl-3-methacryloyloxymethyl-6-butylpyrone-(2), 4-methyl-3-methacryloyloxymethyl-6-cyclohexylpyrone-(2), 3,4-dimethyl-6-acryloyloxymethylpyrone-(2), 4-methyl-6-methacryloyloxymethyl-3-propylpyrone-(2), 5,6-dimethyl-3-acryloyloxymethyl-4-ethylpyrone-(2), 4-methyl-3-methacryloyloxymethyl-5-propyl-6-tolylpyrone-(2), 4-methyl-6-methacryloyloxymethylpyrone-(2), 4,6-dimethyl-5-methacryloyloxymethylpyrone-(2), 4-methyl-6-[2'-methacryloyloxy-2'-methyl]-propylpyrone-(2), 4-methyl-6-(4'-methacryloyloxybutyl)-pyrone-(2).

What is claimed is:

1. A substituted 2-pyrone having the formula

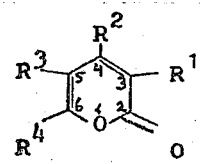   I wherein
R₁ represents hydrogen, alkyl having from 1 to 4 carbon atoms, or halogen;
R₂ represents alkyl having from 1 to 4 carbon atoms,
R₃ represents hydrogen, alkyl having from 1 to 4 carbon atoms, or halogen;
R₄ represents alkyl having from 1 to 6 carbon atoms, cycloalkyl having from 5 to 8 carbon atoms or phenyl optionally substituted by chlorine atoms or methyl groups;

and one single radical among the radical R₁, R₃ and R₄ represents the group

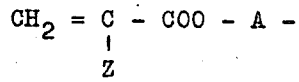   II in which Z stands for hydrogen or methyl and A for straight-chain or branched alkylene having from 1 to 6 carbon atoms.

2. The compound of claim 1 which is 4-methyl-6-methacryloyloxymethylpyrone-(2).

3. The compound of claim 1 which is 4-methyl-6-acryloyloxymethylpyrone-(2).

4. The compound of claim 1 which is 3-chloro-4-methyl-6-methacryloyloxymethylpyrone-(2).

5. The compound of claim 1 which is 3,4-dimethyl-6-metacryloyloxymethylpyrone-(2).

6. The compound of claim 1 which is 4,6-dimethyl-3-methacrylolyoxymethylpyrone-(2).

7. The compound of claim 1 which is 4,6-dimethyl-5-methacryloyloxymethylpyrone-(2).

8. The compound of claim 1 which is 4-methyl-6-[2'-methacryloyloxy-2'-methyl]-propylpyrone-(2).

* * * * *